March 19, 1968     R. BRISEBOIS     3,374,030
DETACHABLE CONNECTION OF A VEHICLE BODY TO A CHASSIS
Filed Dec. 23, 1965     2 Sheets-Sheet 1

INVENTOR
Romeo BRISEBOIS
BY
Pierre Lespérance

PATENT AGENT

March 19, 1968 R. BRISEBOIS 3,374,030
DETACHABLE CONNECTION OF A VEHICLE BODY TO A CHASSIS
Filed Dec. 23, 1965 2 Sheets-Sheet 2
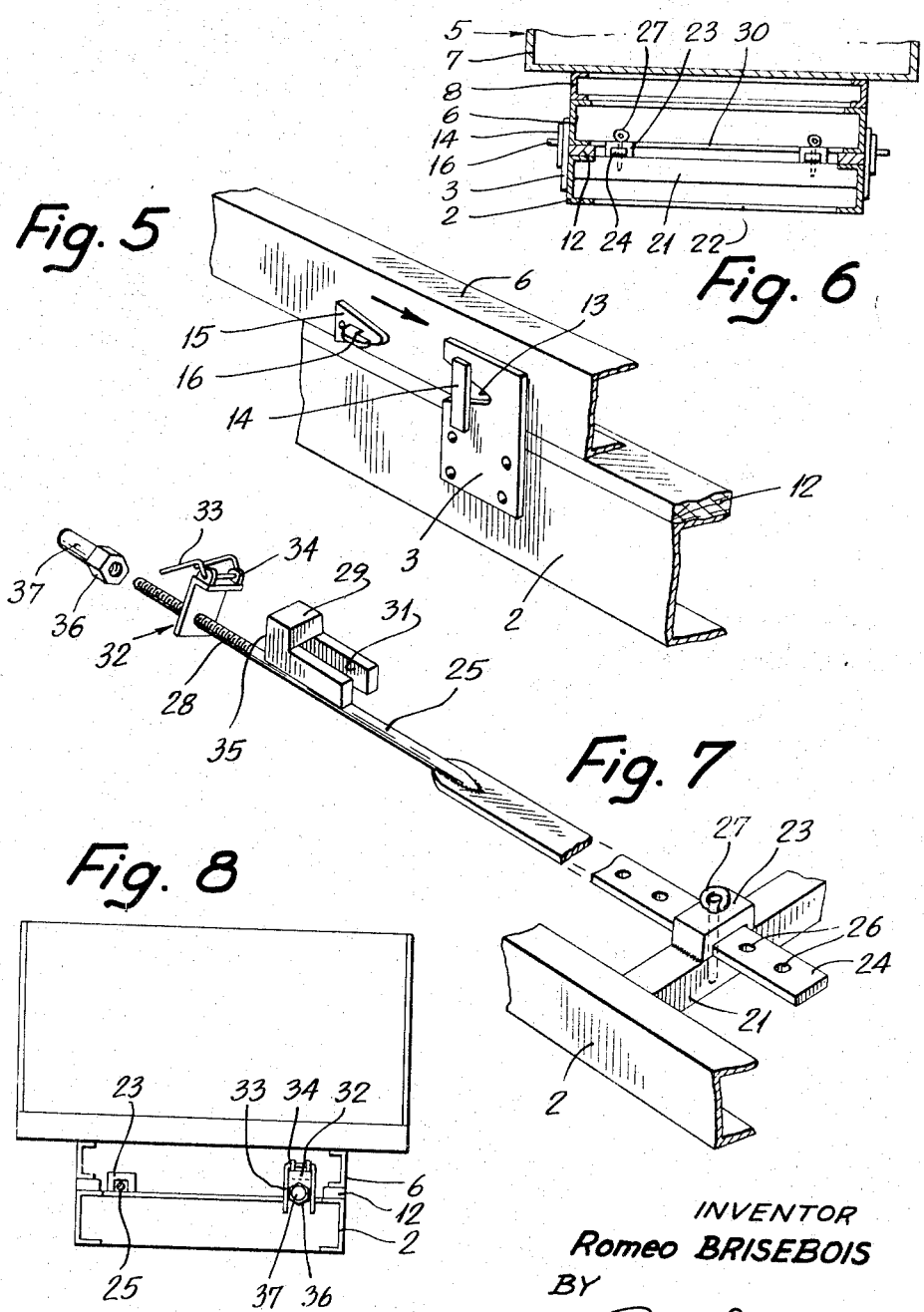
INVENTOR
Romeo BRISEBOIS
BY
Pierre Lespérance
PATENT AGENT United States Patent Office 3,374,030
Patented Mar. 19, 1968

3,374,030
DETACHABLE CONNECTION OF A VEHICLE
BODY TO A CHASSIS
Romeo Brisebois, 75 Archambault St.,
L'Assomption, Quebec, Canada
Filed Dec. 23, 1965, Ser. No. 515,939
Claims priority, application Canada, Dec. 23, 1964,
919,479, Patent 734,310
9 Claims. (Cl. 296—35)

ABSTRACT OF THE DISCLOSURE

This invention concerns trucks having a body detachably connected to the chassis by means of inter-engageable wedging and anchoring members, firmly held in position by anchoring rods attached to the chassis and detachably engaging the body.

The present invention relates to motor vehicles and, more particularly, to trucks having a body detachably connected to the chassis.

The present invention is specifically concerned with means for anchoring a body to a truck chassis and which are releasable in order to replace one body by another.

The general object of the present invention resides in the provision of a system of the character described, which firmly anchors the body to the truck chassis in such a way that it will resist vibration and shocks, and which is yet quickly detachable for replacement of the body by another, or by another accessory.

Another object of the present invention resides in the provision of a connection system of the character described, which is adaptable to various lengths of truck body.

Another object of the present invention resides in the provision of means for effecting a quick change of one body to another.

Another object of the present invention resides in the provision of a system of the character described, which is of relatively simple and inexpensive construction.

The foregoing and other important objects of the present invention will become more apparent during the following disclosure and by referring to the drawings, in which:

FIGURE 5 is a partial perspective view of one of the detachable connections and of the body sill member and vehicle chassis side rail;

FIGURE 6 is a cross-section taken along line 6—6 of FIGURE 2;

FIGURE 7 is a partial perspective view of one of the two anchoring rods for firmly securing the anchoring members; and FIGURE 8 is a back end view of the chassis and body of the truck.

Figure 2:
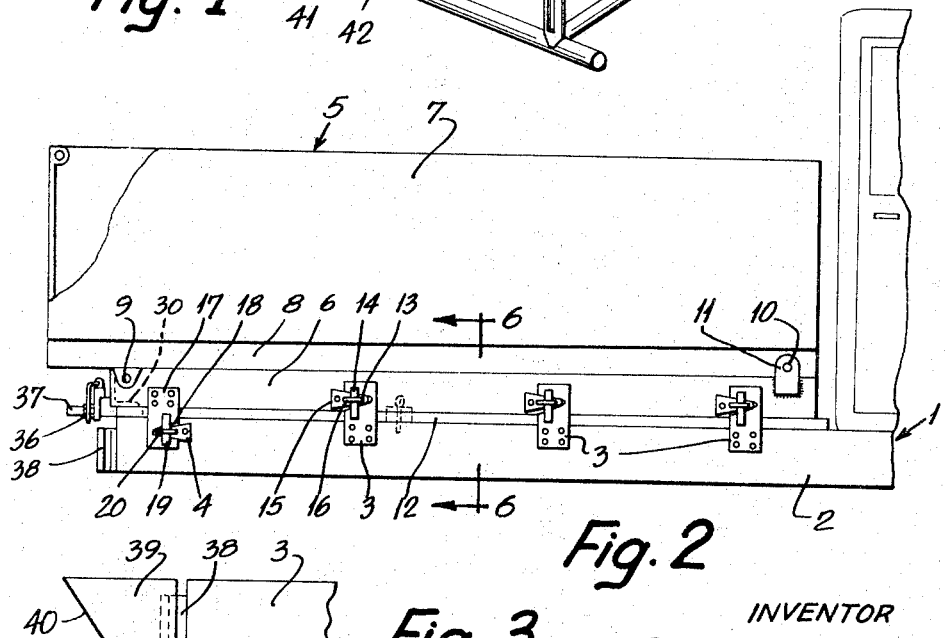
FIGURE 2 is a partial side elevation of a truck, partially in section, and showing the anchoring system in accordance with the invention.

Referring now more particularly to the drawings in which like reference characters indicate like elements throughout, FIGURE 2, shows a motor vehicle comprising a truck chassis, generally indicated at 1, which includes spaced side rails 2, of channel-shaped cross-section, provided on the outer side thereof with a plurality of longitudinally spaced upstanding anchor plates 3, while the rear ends of said side rails are provided with a wedge member 4.

A vehicle body, generally indicated at 5, includes a pair of transversely spaced sill members 6, on which the vehicle body is supported. In the example shown, the vehicle body is a dump box 7, provided with longitudinal supporting beams 8 which are pivoted at their rear ends at 9 to the rear ends of sill members 6. In the rest position of the dump box, the beams 8 rest directly on sill members 6 and are locked thereto by passing a locking pin through the hole 10 of a bracket 11 secured to the front end of each sill member 6 and inserted in a registering hole made in the front end of beam 8.

The sill members 6 correspond in shape to the side rails 2 and are spaced the same distance apart, so as to rest flush thereon with the interposition of a pad 12, preferably consisting of a wooden plank, or board, extending the whole length of the sill member 6.

Each anchor plate 3, secured in a side rail 2, consists of a flat plate, of generally rectangular shape, upstanding from the top of the side rails and secured to the outer side thereof and adapted to overlap the outer side of the sill member 6.

The anchor plate 3 is provided with a lateral V-shaped notch 13, the apex of which is directed towards the front of the truck. A short bar 14 is welded to the outside of the anchor plate vertically across the V-shaped notch 13. The sill members 6 are each provided with a plurality of longitudinally spaced wedge members 15, consisting of a triangular plate, welded or otherwise rigidly secured to the outer face of the sill member and having their apex pointing towards the front of the truck and adapted to engage the V-notch 13 of the anchor plates 3 behind the bar 14.

Each wedge member 15 is provided with an outwardly protruding hook-shaped member 16 adapted to overlie and engage the outside face of the bar 14 when the wedge 15 is in engagement with the notch 13.

In the engaged position, the top face of the wedge 17 engages the top edge of the V-notch 13 of the associated anchor plate, while the lower faces of the wedge and V-notch are not in contact, to thereby produce a downward wedging force on the sill member 6 against the pad 12 and side rail 2.

The rear end portion of the sill member 6 is provided with a downwardly extending anchor plate 17, similar to anchor plate 3, disposed on the outside of the sill member and provided with a V-notch 18, the apex of which is directed towards the back of the truck.

This anchor plate is also provided with a vertical bar 19 on the outside thereof. The notch 18 of the anchor plate 17 is adapted to receive the wedge member 4 with the lower edge of the V-notch 18 in firm engagement with the lower edge of the wedge member 4. Wedge member 4 has an outwardly protruding hook member 20, adapted to overlie and engage the bar 19.

The two side rails 2 are interconnected by a cross beam 21 in a zone spaced from the rear ends of said side rails and said rear ends are interconnected by a back cross beam 22 in the usual manner.

A pair of retainer plates 23 are secured to the top of cross beam 21 near the side rails 2 and form with the cross beam 21 a rectangular opening for the insertion of a flat bar 24, the back end of which is extended by an anchoring rod 25. Flat bar 24 is provided with a plurality of spaced holes 26 adapted to register with aligned holes made in the retainer plate 23 and cross beam 21 for the insertion of a locking pin 27, to firmly secure the anchoring rods 25 in adjusted position to the chassis 1 of the truck.

The back threaded end 28 of each anchoring rod 25 is adapted to rest freely on the back cross beam 22 of the truck chassis 1, when there is no body 5 on the truck chassis.

A pair of thrust plate brackets 29 are welded, or otherwise rigidly secured, to the back cross beam 30 secured to the rear ends of the sill members 6.

Each bracket 29 forms a passage 31 longitudinally thereof, which is open at the two ends of the bracket and at the underface thereof. This passage serves to receive the anchoring rod 25.

A nut locker 32, consisting of a flanged plate having a hole for freely receiving the threaded end 28 of the anchoring rod 25 and a wire stirrup 33 pivoted at 34 to the top of the nut locker, is adapted to abut against the back face 35 of the bracket 29, and a nut 36 is adapted to be screwed on the rearwardly protruding threaded end 28 of the anchoring rod and abut against the nut locker 32.

The stirrup 33 is then pivoted downwardly to engage the sides of the nut 36 and prevent accidental rotation of the same. Nut 36 is preferably provided with a sleeve-like cap 37, freely enclosing the outer end of the anchoring rod 25 to protect the same against dirt and rusting.

The side rails 2 are provided with means to increase the length of the same, depending on the type of vehicle body 5 being carried by the truck.

Figure 3:
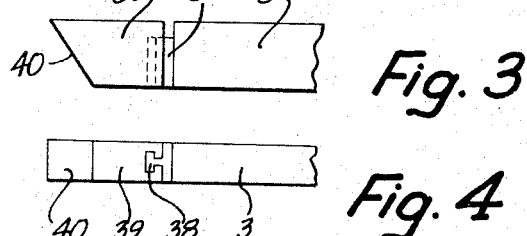
FIGURE 3 is a partial side elevation of the rear end of a side rail of the truck chassis fitted with an extension.
Figure 4:
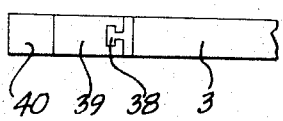
FIGURE 4 is a bottom plan view of the elements shown in FIGURE 3.

As shown in FIGURES 3 and 4, the rear end of the side rails 2 is provided with a vertically disposed connector member 38, of T-shape cross-section, and extending upwardly to a level below the top of the side rails. An extension 39, of the same overall cross-section as that of the side rails 2, has a front plate provided with a notch opening at the bottom of the extension and adapted to slidably receive the web of the connector member 38 with the head of said connector member engaged within the extension 39.

When the rail extension 39 is in position, its top face is flush with the top face of the side rails. Preferably, the rear end 40 of the rail extension is bevelled.

Figure 1:
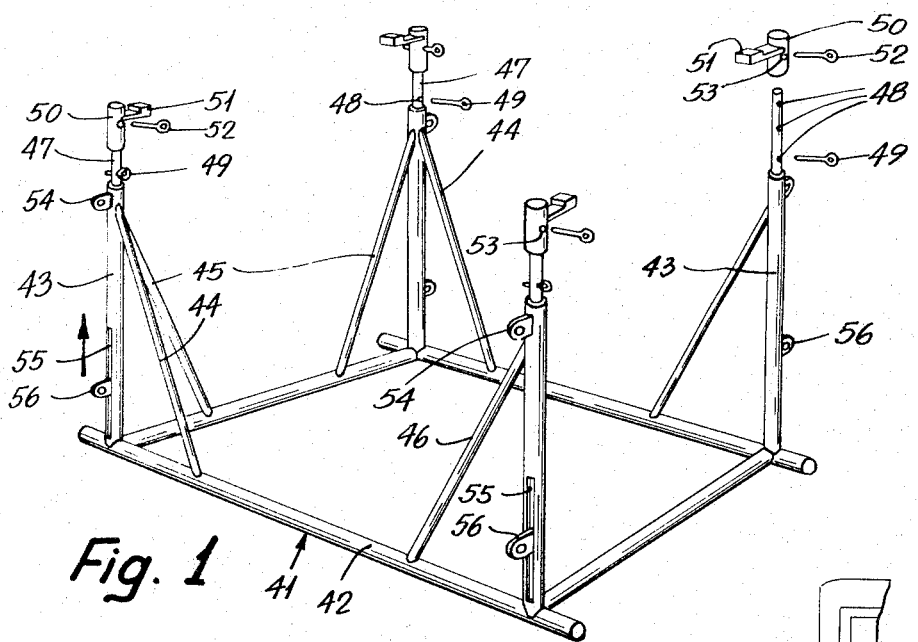
FIGURE 1 is a perspective view of a rack adapted to support a tuck body while not in use and when fitting said body to a truck chassis or removing the body from the chassis.

FIGURE 1 shows in perspective view a simple support rack for supporting a vehicle body 5 when the latter is not in use and for raising the same in order to transfer the body onto the truck chassis and from the same.

The rack generally indicated at 41, comprises a rectangular frame 42 adapted to rest on the ground and at the four corners of which are secured tubular uprights 43. The uprights at the back of the rack are reinforced by longitudinal and transversal braces 44 and 45, respectively, while the uprights at the front of the rack are only reinforced by longitudinal braces 46, so as to provide a clear passage for the truck backing into the rack.

A rod 47 is telescopically engaged in each tubular upright 43; each rod 47 is provided at its upper end with a plurality of transverse holes 48 for the insertion of a pin 49, adapted to abut against the upper end of upright 43 to hold the rod 47 in adjusted elevation.

The outer end of each rod 47 is fitted with a sleeve-like cap 50 having an integral laterally extending support arm 51. Cap 50 is rotatable on rod 47, but can be locked against rotation by insertion of a locking pin 52 through a hole 53 made in the side of the cap 50 and through the uppermost hole 48 of rod 47.

Each tubular upright 53 is provided near its upper end with an apertured ear 54 in its lower portion with a longitudinal slot 55, through which freely extends an ear 56, also provided with a hole, and rigidly secured to the lower end portion of rod 47.

Conventional chain pullers are used in association with the rack 41 to raise the rods 47 supporting the vehicle body 5. Each chain puller 2 itself is attached to one of the ears 54, 56, while the chain is attached to the other ear. Upon operation of the chain puller, the two ears are brought together, thereby raising the rod 47.

The system in accordance with the invention is used as follows:

As an illustration, it is supposed that it is designed to replace a dump box by a cement mixer unit. The two nuts 36 and two nut lockers 32 are removed; the stirrups 33 being lifted to unscrew the nuts. Then the back of the vehicle body 5 is hitched to a suitable anchoring member, such as a concrete block or another truck, and the driver moves the truck forwardly so as to give a pull on the vehicle body 5, which thereby slides rearwardly along the side rails 2 to the extent of four or five inches, in order that the wedge members 4 and 15 will clear the associated anchor plates 3 and 17.

The vehicle body 5 is then detached from the anchoring block and the truck is backed up between the uprights 43 of the rack 41, the lateral arms 51 being rotated outwardly to clear the sides of the body 5.

Once the truck is in position, the arms 51 are rotated to extend inwardly within the rack and underneath the sides of the body 5 and then locked in this position by pins 52.

The chain pullers are then operated to raise the rods 47 and therefore the body 5 slightly off the truck chassis 1. The truck is moved forwardly from underneath the vehicle 5 which is then left resting on the rack 41 for the entire duration of non-use.

The truck chassis is thereafter backed up into another rack 41 supporting a vehicle body to be attached to the truck chassis. The latter is positioned such that its anchor plates and wedge elements will just clear and be forwardly disposed with respect to the mating wedge elements and anchor plates of the vehicle body to be attached.

Chain pullers are then fitted to the ears 54, 56 of the rack. The locking pins 49 are removed; and the chain pullers are operated so as to lower the vehicle body so that its sill members 6 will rest on the side rails 3 of the truck chassis with the interposition of the pad boards 12.

During lowering of the vehicle body, the anchor rods 25 automatically engage the longitudinal passages 31 of the thrust plate brackets 29.

If the new vehicle body is a cement mixer and therefore longer than the dump box previously carried by the truck, the rail extensions 39 would be fitted to the rear end of the side rails 2 by means of connector members 38 prior to lowering of the cement mixer body onto the truck chassis. The truck is then moved forwardly from between the rack uprights 43 after having rotated the cap members 50 so as to move the arms 51 laterally outwardly, to clear the vehicle body.

The truck is moved forwardly and then suddenly stops to thereby cause the sill members 6 of the vehicle body to slide forwardly with respect to the side rails so that the wedge members will engage the V-notches of the anchor plates.

The nut lockers 32 are then fitted onto the anchoring rods 25 protruding at the back of the truck and the nuts 36 are then screwed tight to firmly engage the wedge members into the V-notches of the anchor plates, and the stirrups 33 are lowered onto the nuts 36 to lock the latter against accidental rotation.

In the case of a cement mixer which has a longer frame than that of a dump box, prior to lowering of the cement mixer body onto the truck chassis, it would have been normally required to adjust the longitudinal position of the anchoring rods 25 by adjusting the position of the flat bars 24 within the retainer plates 23 by means of locking pins 27.

Actual practice with the system in accordance with the invention has shown that three men, namely: the driver of the truck and two men of making the actual change, can, within twelve minutes, remove a vehicle body and reinstall another one onto the same truck chassis, Any type of vehicle body may be fitted on the truck chassis, such as dump boxes, ordinary boxes, cement mixer units and even a fifth wheel adapted to connect a semi-trailer.

The system in accordance with the invention enables to reduce considerably the number of truck units, compared to the conventional manner of providing a truck unit for each vehicle body required.

Because the system in accordance with the invention provides a very quick change of vehicle body, there is very little down time for the trucks, which is very important because, in certain applications, the same truck may require a change of vehicle body as much as ten times a day.

The anchoring system of the invention provides a very firm connection between the truck chassis and vehicle body, the anchoring rods 25 and nuts 36 forming a system which completely eliminates any play between the sill member 6 and the side rails 2. Moreover, the hook-shaped members 16 engaging the bars 14 of the anchor plates, provide a firm connection on both sides of the truck against lateral displacement of the body with respect to the chassis.

While a preferred embodiment in accordance with the invention has been illustrated and described, it in understood that various modifications may be resorted to without departing from the spirit and scope of the appended claims.

What I claim is:

1. A motor vehicle chassis and body assembly comprising a chassis having laterally spaced side rails, a motor vehicle body having laterally spaced sill members resting on and supported by said side rails, inter-engageable wedging and anchoring members on said side rails and on said sill members inter-engageable by forward displacement of said sill members with respect to said side rails, anchoring rods secured at one end to said chassis, thrust plate brackets secured to the back of said vehicle body and through which said anchoring rods removably extend, and fastener means mounted on said anchoring rods and adjustably engaging said thrust plate brackets to take up any slack between said inter-engageable wedging and anchoring members.

2. A motor vehicle chassis and body assembly as claimed in claim 1, wherein said anchoring rods extend longitudinally of said chassis and their forward end portions have an adjustable connection with said chassis.

3. A motor vehicle chassis and body assembly as claimed in claim 1, wherein said thrust plate brackets are formed with a downwardly extending channel opening at the ends thereof for receiving said anchoring rods upon lowering movement of said vehicle body onto said chassis.

4. A motor vehicle chassis and body assembly as claimed in claim 1, wherein said anchoring rods have a threaded portion and said fastener means consist of a nut screwed on said threaded portion.

5. A motor vehicle chassis and body assembly as claimed in claim 1, wherein said inter-engageable wedging and anchoring members consists of wedge members and of plates having a V-shaped notch laterally opening to receive said wedge members, said wedge members and plates secured to the outside of said side rails and of said sill members.

6. A motor vehicle chassis and body assembly as claimed in claim 5, wherein said wedge members have a laterally outwardly protruding hook shape member and said plate members have a vertically bar secured thereto extending vertically across said V-shaped notch, said hook members of said wedge members engageable with the outside of said bars to form a positive lock against lateral displacement of said vehicle body with respect to said chassis.

7. A motor vehicle chassis and body assembly comprising a chassis having laterally spaced side rails, back and intermediate cross beams interconnecting said side rails at the back ends thereof and intermediate their ends, a motor vehicle body having laterally spaced sill members and a cross beam interconnecting the rear ends of said sill members, said sill members resting on and supported by said side rails with the intermediary of pad members, interengageable anchoring members on said side rails and on said sill members, inter-engageable by forward displacement of said sill members with respect to said side rails, longitudinally extending anchoring rods secured at their front end to said intermediate cross beam of said chassis, the rear end portion of said anchoring rods being threaded and adapted to rest on said back cross beam of said chassis, thrust plate brackets secured to said back cross beam of said sill members of said vehicle body and each provided with a downwardly extending channel opening at the front and back ends of said thrust plate bracket and at the underface thereof, said passages adapted to removably receive said anchoring rods upon lowering movement of said body on said chassis with said rods protruding from the back ends of said thrust plate brackets, and nuts threaded on said protruding ends of said anchoring rods and tightly engaging a face of said thrust plate brackets to take up any slack between said inter-engageable anchoring members.

8. A motor vehicle chassis and body assembly as claimed in claim 7, further including means providing an adjustable connection between the forward end portions of said anchoring rods and said intermediate cross beam of said chassis, and further including side rails extension members removably secured to the rear ends of said side rails.

9. A motor vehicle chassis and body assembly as claimed in claim 7, in combination with a rack for supporting said vehicle body when off said chassis and for raising and lowering said vehicle body off and onto said chassis, said rack comprising a ground-engaging substantially rectangular frame, uprights at the four corners of said frame and adapted to clear the sides of the vehicle chassis when the latter is backed into said frame, each upright consisting of outer and inner telescopic tubular members, the outer one of said members having an apertured ear at its upper end and a longitudinal slot at its lower end, the inner one of said tubular members having at its lower end a laterally protruding apertured ear slidably engageable with said slot, and a cap member removably and rotatably mounted on the upper end of said inner tubular member and having a laterally protruding vehicle body supporting arm, said arm rotated to be directed inwardly of said rack engageable underneath said vehicle body and clearing said vehicle body when pivoted outwardly of said rack, said ears adapted to be connected to chain pullers for raising and lowering said inner tubular members.

References Cited

UNITED STATES PATENTS

| | | | |
|---|---|---|---|
| 1,008,713 | 11/1911 | Grace | 296—35 |
| 1,222,868 | 4/1917 | Holland | 296—35 |
| 1,243,636 | 10/1917 | Schulz | 214—516 |
| 1,293,090 | 2/1919 | Harmon | 296—35 |
| 1,541,457 | 6/1925 | Winn | 105—366 |
| 2,044,592 | 6/1936 | Richards | 296—35 |
| 3,177,007 | 4/1965 | Oren | 280—179 |

BENJAMIN HERSH, *Primary Examiner.*

J. A. PEKAR, *Assistant Examiner.*